(12) United States Patent
Kuroki

(10) Patent No.: US 9,177,394 B2
(45) Date of Patent: Nov. 3, 2015

(54) IMAGE PROCESSING DEVICE

(75) Inventor: Jun Kuroki, Superior, CO (US)

(73) Assignee: KONICA MINOLTA LABORATORY U.S.A., INC., San Mateo, CA (US)

(*) Notice: Subject to any disclaimer, the term of this patent is extended or adjusted under 35 U.S.C. 154(b) by 164 days.

(21) Appl. No.: 13/429,201

(22) Filed: Mar. 23, 2012

(65) Prior Publication Data

US 2013/0249920 A1      Sep. 26, 2013

(51) Int. Cl.
*G06F 17/00* (2006.01)
*G06T 11/00* (2006.01)
*G06F 17/30* (2006.01)

(52) U.S. Cl.
CPC .......... *G06T 11/00* (2013.01); *G06F 17/30017* (2013.01)

(58) Field of Classification Search
CPC ................................................ G06F 17/30017
USPC ................................................ 715/201, 243
See application file for complete search history.

(56) References Cited

U.S. PATENT DOCUMENTS

| | | | |
|---|---|---|---|
| 6,195,093 B1* | 2/2001 | Nelson et al. ................. | 715/732 |
| 8,195,768 B2* | 6/2012 | Vaughan et al. .............. | 709/219 |
| 2005/0058431 A1* | 3/2005 | Jia et al. ........................... | 386/69 |
| 2005/0093888 A1* | 5/2005 | Rao ................................ | 345/629 |
| 2005/0110960 A1* | 5/2005 | Mao et al. ..................... | 353/100 |
| 2007/0097431 A1* | 5/2007 | Matsuda et al. .............. | 358/1.15 |
| 2007/0147787 A1* | 6/2007 | Ogawa et al. ................. | 386/107 |
| 2008/0154951 A1* | 6/2008 | Martinez et al. ........... | 707/103 Y |
| 2009/0073266 A1* | 3/2009 | Abdellaziz Trimeche et al. ............................. | 348/180 |
| 2010/0058187 A1* | 3/2010 | Jeong ............................ | 715/716 |
| 2010/0123908 A1* | 5/2010 | Denoue et al. ................ | 358/1.6 |
| 2010/0162123 A1* | 6/2010 | Pratt ............................. | 715/731 |
| 2011/0032388 A1* | 2/2011 | Manico et al. ........... | 348/231.99 |
| 2011/0217021 A1* | 9/2011 | Dubin et al. .................. | 386/278 |
| 2011/0231265 A1* | 9/2011 | Brown et al. ............. | 705/14.73 |
| 2012/0316900 A1* | 12/2012 | Shore ................................ | 705/5 |
| 2013/0007601 A1* | 1/2013 | Grams ........................ | 715/247 |
| 2013/0166381 A1* | 6/2013 | Umeda ...................... | 705/14.53 |
| 2013/0185622 A1* | 7/2013 | Odean et al. ................. | 715/230 |
| 2013/0205202 A1* | 8/2013 | Xiao et al. ..................... | 715/249 |
| 2013/0216206 A1* | 8/2013 | Dubin et al. .................. | 386/282 |
| 2013/0226979 A1* | 8/2013 | Caruso et al. ................ | 707/827 |
| 2014/0040859 A1* | 2/2014 | Jaramillo ..................... | 717/113 |

OTHER PUBLICATIONS

Mahar, S., et al, "Less Is More When Developing PowerPoint Animations", Information Systems Educational Journal, vol. 7, No. 82, ISSN: 1545-679X, Jul. 22, 2009, pp. 1-11.*

* cited by examiner

*Primary Examiner* — Laurie Ries
(74) *Attorney, Agent, or Firm* — Osha Liang LLP

(57) ABSTRACT

A method for processing an electronic document (ED) using a page rendering device (PRD), including: identifying, within the ED, a slide including an animation sequence of a plurality of objects; generating, based on the slide, a first frame lacking the animation sequence and including a first object of the plurality of objects; generating, based on the slide, a second frame lacking the animation sequence and including a second object of the plurality of objects; and placing, by the PRD and during a rendering the ED, the first frame on a first page.

16 Claims, 6 Drawing Sheets

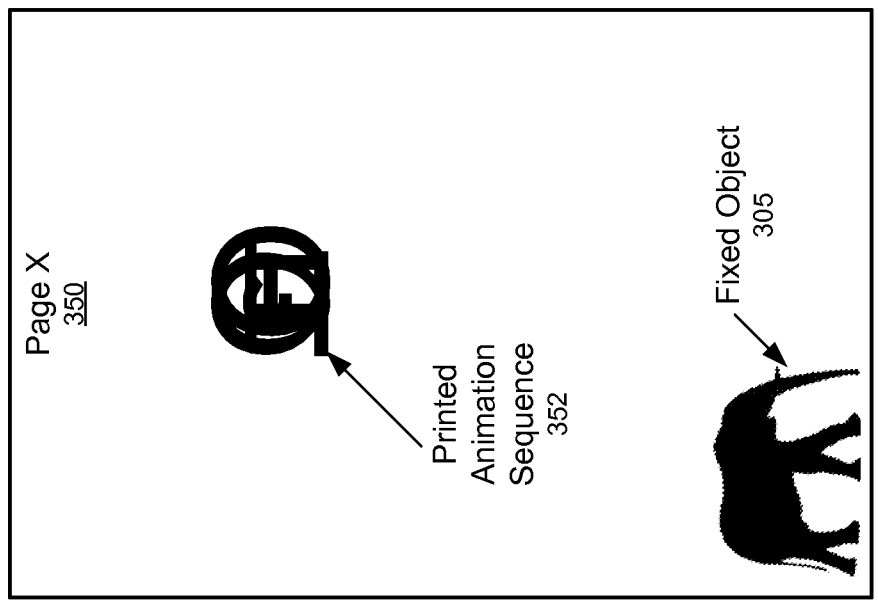

Page Y
360

Frame A
361

Object A
311

Fixed Object
305

Frame B
362

Object B
312

Fixed Object
305

Frame C
363

Object C
313

Fixed Object
305

Frame D
364

Object D
314

Fixed Object
305

IMAGE PROCESSING DEVICE

BACKGROUND

Although the demand for printing electronic documents (EDs) is decreasing because of recent improvements in computer displays, there are still those who generate hardcopies of EDs for purposes of reading the EDs. For example, some readers may simply prefer reading a hardcopy over staring at a computer screen. In other instances, hardcopies of the EDs may be provided to a group of people at an informal presentation, or in other situations where reading from a projector screen or computer display is not convenient.

An ED often includes a slide with an animation sequence having any number of objects. During a slide show, the animation sequence is advanced from one object to the next based on timers and/or input from a pointing device or keyboard operated by a user.

Although the animation sequence may improve the appearance of the slide and/or aid the user/viewer in comprehending the subject matter on the slide while the slide is being displayed, the objects of the animation sequence may print as a single cluster if a hardcopy of the ED is generated. In other words, the animation sequence may be unrecognizable and/or incomprehensible in a hardcopy format. Regardless, user still like generating hardcopies of slides having animation sequences.

SUMMARY

In general, in one aspect, the invention relates to a method for processing an electronic document (ED) using a page rendering device (PRD). The method comprises: identifying, within the ED, a slide comprising an animation sequence of a plurality of objects; generating, based on the slide, a first frame lacking the animation sequence and comprising a first object of the plurality of objects; generating, based on the slide, a second frame lacking the animation sequence and comprising a second object of the plurality of objects; and placing, by the PRD and during a rendering the ED, the first frame on a first page.

In general, in one aspect, the invention relates to a non-transitory computer readable medium (CRM) storing instructions for processing an electronic document (ED) using a page rendering device (PRD). The instructions comprising functionality for: identifying, within the ED, a slide comprising an animation sequence of a plurality of objects; generating, based on the slide, a first frame lacking the animation sequence and comprising a first object of the plurality of objects; generating, based on the slide, a second frame lacking the animation sequence and comprising a second object of the plurality of objects; and placing, using the PRD and during a rendering the ED, the first frame on a first page.

In general, in one aspect, the invention relates to a system for processing an electronic document (ED). The system comprises: a hardware processor; a parser executing on the hardware processor and configured to identify, within the ED, a slide comprising an animation sequence of a plurality of objects; a frame generator executing on the processor and configured to: generate, based on the slide, a first frame lacking the animation sequence and comprising a first object of the plurality of objects; and generate, based on the slide, a second frame lacking the animation sequence and comprising a second object of the plurality of objects; and a layout engine configured to place, during a rendering of the ED, the first frame on a first page.

Other aspects of the invention will be apparent from the following description and the appended claims.

BRIEF DESCRIPTION OF DRAWINGS

FIGS. 3A, 3B, and 3C show an example in accordance with one or more embodiments of the invention.

DETAILED DESCRIPTION

Figure 1:
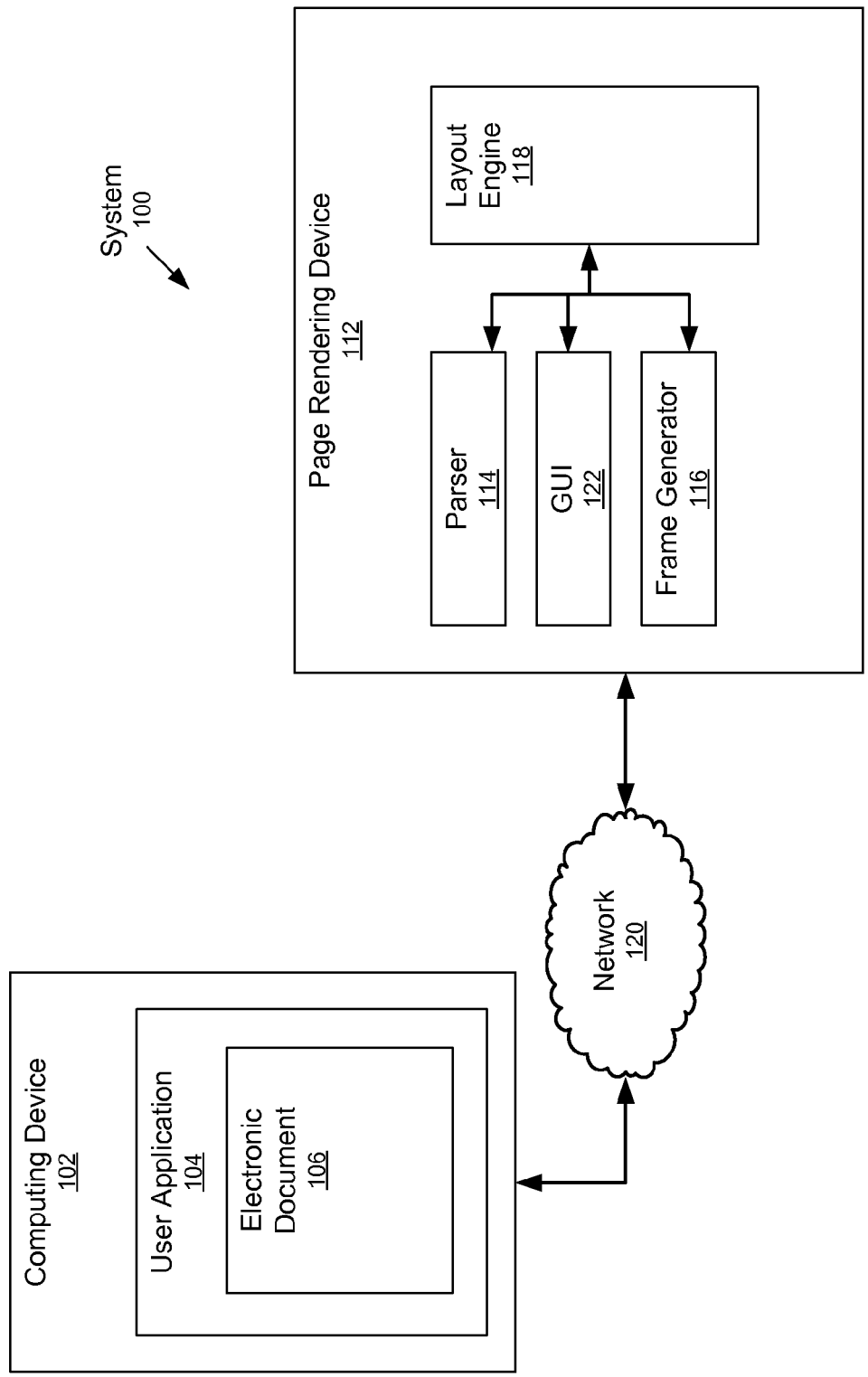
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for generating a hardcopy (e.g., paper printout) of a slide having an animation sequence of multiple objects. Specifically, in response to identifying the animation sequence, multiple frames are created. Each frame lacks the animation sequence but includes one of the objects. The number of frames placed on a page (and thus the number objects per page) may be set by the user.

FIG. 1 shows a system (100) in accordance with one or more embodiments of the invention. As shown in FIG. 1, the system (100) has multiple components including a page rendering device (PRD) (112) and a computing device (102). The PRD (112) may be a printer (e.g., multifunction printer), an electronic reader, etc. The computing device (102) may be a personal computer (PC), a desktop computer, a mainframe, a server, a telephone, a kiosk, a cable box, a personal digital assistant (PDA), an electronic reader, a mobile phone, a smart phone, etc. There may be a direct connection (e.g., universal serial bus (USB) connection) between the computing device (102) and the PRD (112). Alternatively, the computing device (102) and the PRD (112) may be connected using a network (120) having wired and/or wireless segments.

In one or more embodiments of the invention, the PRD (112) is located on the computing device (102). In such embodiments, the PRD (112) may correspond to any combination of hardware and software on the computing device (102) for rendering an ED.

In one or more embodiments of the invention, the computing device (102) executes the user application (104). The user application (104) is a software application operated by a user and configured to obtain, input, generate, display, and/or print an ED (e.g., Electronic Document (106)). Accordingly, the user application (104) may be a word-processing application, a spreadsheet application, a desktop publishing application, a graphics application, a photograph printing application, an Internet browser, a slide show generating application, etc. The user application (104) may generate new EDs and/or obtain previously saved EDs.

In one or more embodiments of the invention, the ED (106) includes one or more slides. Each slide is a panel intended for viewing that may include text, clipart images, photographs, audio clips, video clips, and/or animation sequences. In such embodiments, the ED (106) specifies the one or more slides and the content (e.g., text, clipart, animation sequences, etc.) that is present on the slides.

An animation sequence may correspond to multiple objects (e.g., text characters, clipart images, photographs, etc.) that are displayed one after the other on the slide. Each object may be displayed at the same location (or approximately the same location) within the slide. Each object may be displayed for a predetermined amount of time (e.g., 5 seconds) before the next object is displayed. The currently displayed object may disappear before the next object in the animation sequence is displayed. In one or more embodiments of the invention, a graphical effect (e.g., fading) is used to transition between consecutive objects in the animation sequence. In one or more embodiments of the invention, the user operates a pointing device (e.g., a mouse) or a keyboard to advance the animation sequence. The ED (106) may specify the objects of the animation sequence, the location within the slide for displaying the objects of the animation sequence, the location within a frame for placing an object of the animation sequence (discussed below), display time parameters, and/or the graphical effect(s), if any.

In one or more embodiments of the invention, any object on the slide (e.g., text, clipart image, photograph, etc.) that is not part of an animation sequence is referred to as a fixed object. A fixed object may be viewable during the entire animation sequence and remains visible as long as the slide itself is displayed. A fixed object may be of any size or shape and may be positioned anywhere on the slide. A slide may have any number of fixed objects.

In one or more embodiments of the invention, the ED (106) is represented/defined using a document markup language (e.g., open document format (ODF), office open XML (OOXML), etc.). Accordingly, the properties of the slide(s) and/or animation sequence(s) (i.e., objects in the animation sequence, location(s) within the slide for displaying the objects of the animation sequence, display time parameters, a location within a frame for placing an object of the animation sequence (discussed below), etc.) in the ED (106) may be recorded as attributes within the tags of the document markup language. Moreover, these properties/attributes are needed to correctly render the ED (106) for display or printing.

In one or more embodiments of the invention, the PRD (112) includes a parser (114). The parser (114) is configured to parse the ED (106) to identify at least one slide in the ED (106) having an animation sequence of objects. Further still, the parser (114) may also be configured to parse the ED (106) to identify the properties/attributes of the animation sequence (i.e., objects in the animation sequence, location(s) within the slide for displaying the objects of the animation sequence, display time parameters, a location within a frame for placing an object of the animation sequence (discussed below), etc.).

In one or more embodiments of the invention, the PRD (112) includes a frame generator (116). The frame generator (116) is configured to generate one or more frames for the slide(s) having an animation sequence. A frame is a partial replica of a slide. Specifically, a frame may include all the fixed objects of the slide and one object of the multiple objects in the animation sequence. The position of the object within the frame is specified with the ED (e.g., as a tag). For example, if the animation sequence has four objects, the frame generator (116) may generate four frames, each frame having one of the four objects and all of the fixed objects in the slide. In one or more embodiments of the invention, the frame lacks (i.e., does not have) the animation sequence.

In one or more embodiments of the invention, the PRD (112) includes a graphical user interface (GUI) (122). The GUI (122) may include any number of widgets (e.g., drop-down boxes, radio buttons, sliders, etc.) and is configured to collect a multiple-frames-per-page (MFPP) request from a user. The GUI (122) may be displayed to the user in response to a request to print the ED (106). In one or more embodiments of the invention, the GUI (122) is executed by the computing device (102) and/or is part of the user application (104). The MFPP request may specify that 1 frame be placed on a page, 2 frames be placed on a page, 4 frames be placed on a page, etc. The default may be set by the user (e.g., 1 frame per page).

In one or more embodiments of the invention, the MFPP is set/configured/requested using a control panel on the PRD (112). In one or more embodiments of the invention, the MFPP is set/configured/requested using a website that interacts with the PRD (112). In one or more embodiments of the invention, the MFPP is set/configured/requested by the user application (104), and transmitted to the PRD (112) in a print ticket associated with a print job.

In one or more embodiments of the invention, the PRD (112) includes a layout engine (118). The layout engine (118) is configured to scale the frames and/or calculate the positions/placement (e.g., x, y coordinates) of the frames on a physical medium (i.e., paper, transparencies, microfilm, etc.) based on the MFPP request. The layout engine (118) may place each frame on its own page or may place multiple frames on the same page, depending on the MFPP request, if any. Accordingly, the layout engine (118) is configured to render the ED (106) for printing.

Figure 2:
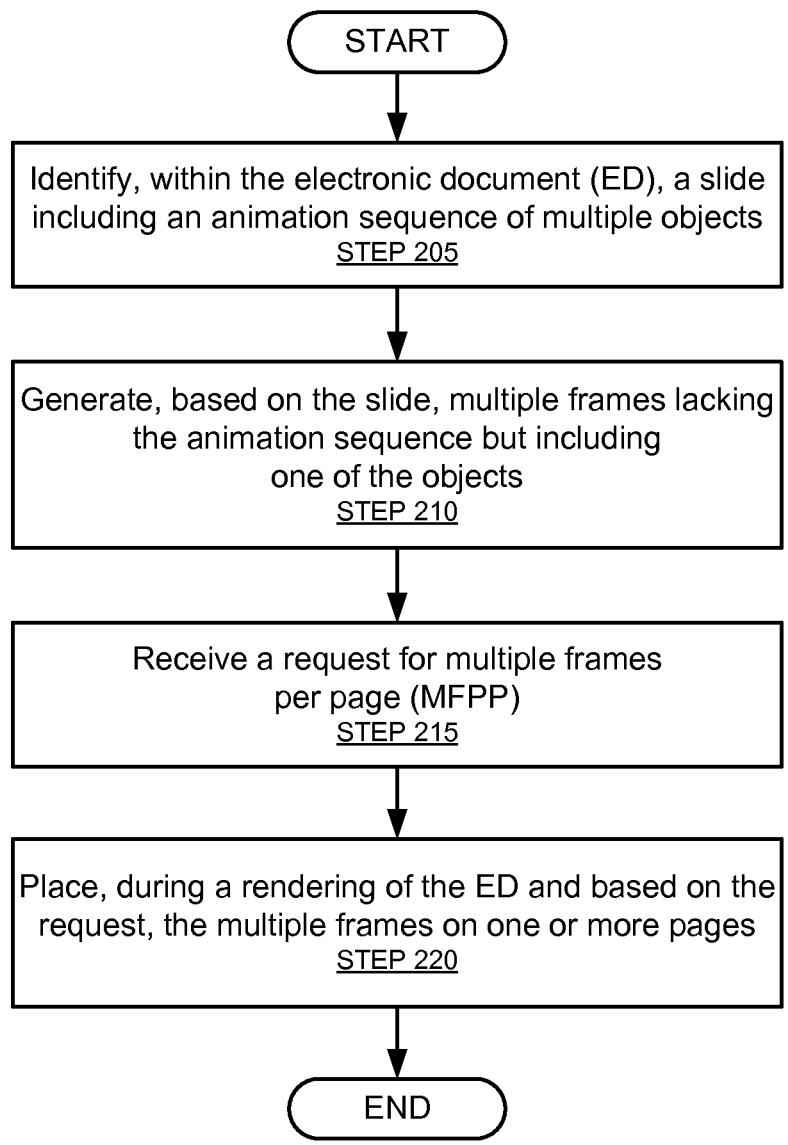
FIG. 2 shows a flowchart in accordance with one or more embodiments of the invention.

FIG. 2 shows a flowchart for processing an ED using a PRD in accordance with one or more embodiments of the invention. One or more steps in FIG. 2 may be executed by the system (100) (e.g., PRD (112)). The sequence of steps shown in FIG. 2 may differ among embodiments of the invention, and one or more of the steps may be performed in parallel and/or may be optional. Moreover, one or more steps in FIG. 2 may be repeated. Accordingly, the scope of the invention should not be considered limited to the specific arrangement of steps shown in FIG. 2.

Initially, a slide having an animation sequence of objects is identified within an ED (STEP 205). The slide may be identified by parsing the ED. The slide may be identified in response to a request to print all or a portion of the ED. In one or more embodiments of the invention, the ED (106) is represented/defined using a document markup language (e.g., open document format (ODF), office open XML (OOXML), etc.). Accordingly, the properties of the slide, including the existence of the animation sequence, may be recorded as attributes within the tags of the document markup language.

In STEP 210, multiple frames are generated for the slide having the animation sequence. As discussed above, a frame is a partial replica of the slide. Specifically, a frame may include all the fixed objects of the slide and one object of the multiple objects in the animation sequence. In one or more embodiments of the invention, the position of the object within the frame is identified by parsing the ED (i.e., the position is specified in the ED as a tag). For example, if the animation sequence has six objects, six frames may be generated, each frame having one of the six objects and all of the fixed objects in the slide. In one or more embodiments of the invention, the frame lacks (i.e., does not have) the animation sequence.

In STEP 215, a request for multiple frames per page (MFPP) is received from the user. In one or more embodiments of the invention, the user modifies one or more GUI widgets (e.g., drop-down boxes, radio buttons, sliders, etc) to create/send the MFPP request. The MFPP request may be effectively collected by the GUI. The MFPP request specifies the number of frames that are to be placed on each page when the ED or portion of the ED is rendered. For example, the MFPP request may specify that four frames are to be placed on each rendered page (except perhaps the final page). As another example, the MFPP request may specify that 6 frames are to be placed on each rendered page. In one or more embodiments of the invention, STEP 215 is optional. If the print job does not specify the MFPP, the PRD may use the default value previously set by the user.

In STEP 220, the PRD renders the ED (or a portion of the ED) by placing the frames on one or more pages. Moreover, the frames are placed on the one or more pages based on the MFPP request, if any. Rendering the ED may include scaling the frames and/or calculating the positions (e.g., coordinates) of the frames on each page (e.g., paper, transparencies, microfilm, region on a computer monitor displaying a page image, e-book reader, etc.) and then printing/displaying the page.

Figure 3A:
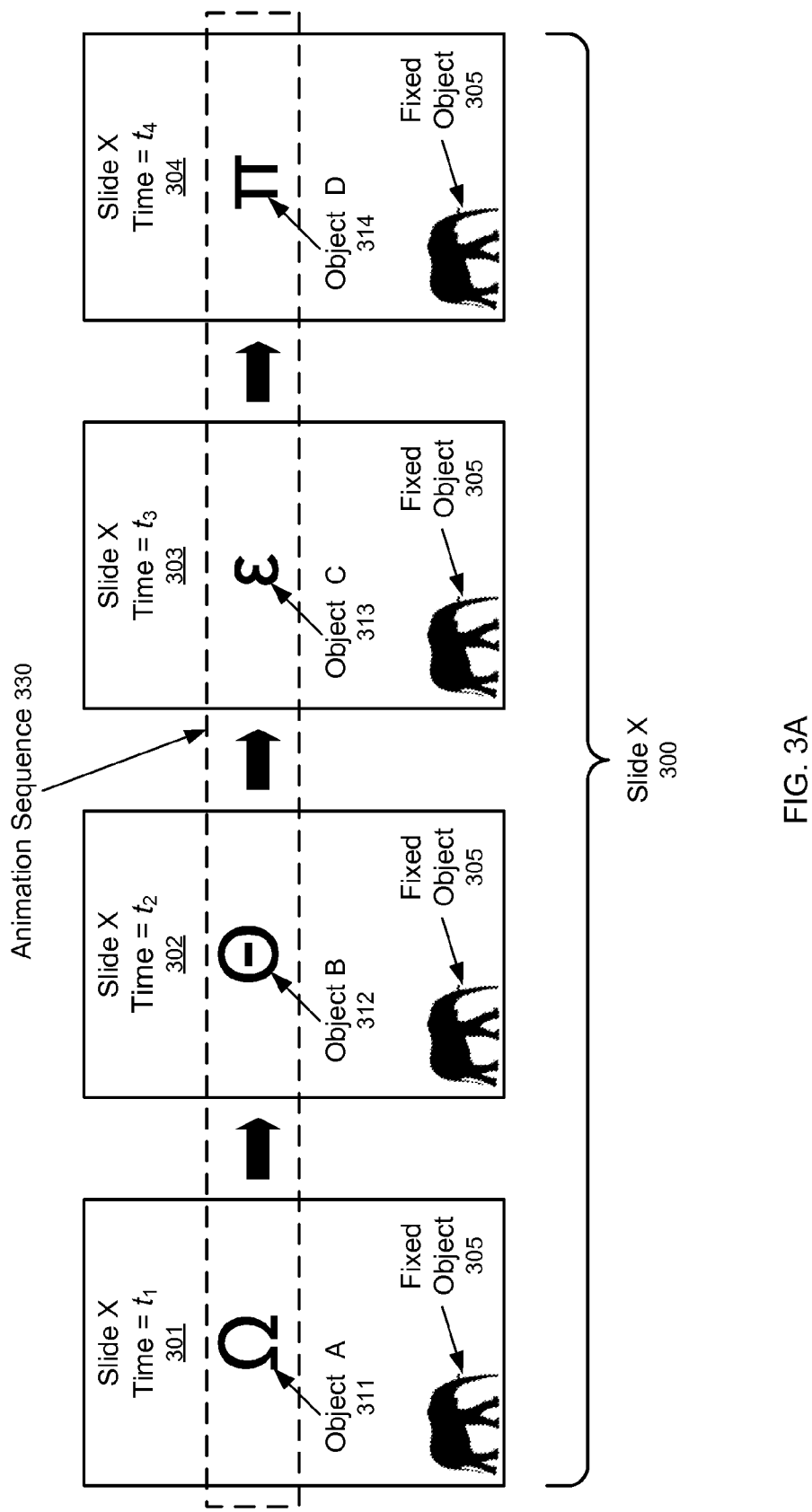
Figure 3C:
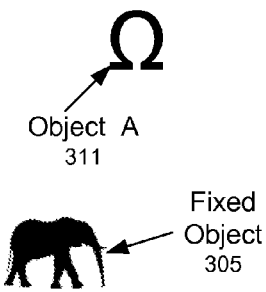
Figure 3C:
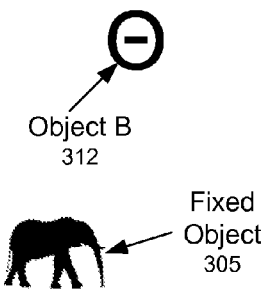
Figure 3C:
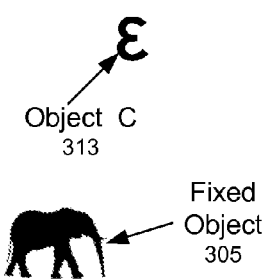
Figure 3C:
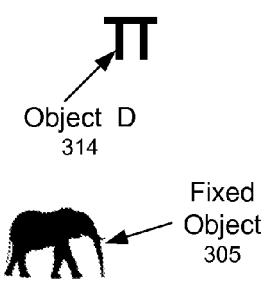

FIGS. 3A, 3B, and 3C show an example in accordance with one or more embodiments of the invention. FIG. 3A shows slide X (300) having an animation sequence (330) and a fixed object (305). The animation sequence (330) has four objects: object A (311), object B (312), object C (313), and object D (314). At time=$t_1$ (301), only object A (311) and the fixed object (305) are displayed on slide X (300). At time=$t_2$ (302), only object B (312) and the fixed object (305) are displayed on slide X (300). At time=$t_3$ (303), only object C (313) and the fixed object (305) are displayed on slide X (300). At time=$t_4$ (304), only object D (314) and the fixed object (305) are displayed on slide X (300). The user may advance the animation sequence (330) (i.e., move from $t_1$ to $t_2$, or $t_2$ to $t_3$, or $t_3$ to $t_4$, etc.) using a pointing device and/or keystrokes on a keyboard. Alternatively, the animation sequence (330) may advance according to timers of the same or variable durations. For example, object A (311) may be displayed for 10 seconds. After 10 seconds, the animation sequence (330) advances and object B (312) is displayed for 8 seconds.

FIG. 3B shows a page (i.e., Page X (350)) in accordance with one or more embodiments of the invention. Page X (350) is the result of printing (e.g., on paper) slide X (300) without using system (100) of FIG. 1, discussed above, and/or without using the process of FIG. 2, discussed above. As shown in FIG. 3B, page X (350) includes the fixed object (305). FIG. 3B also includes a printed animation sequence (352), which is the result of printing the animation sequence (330). Specifically, the printed animation sequence (352) corresponds to all of the objects (311, 312, 313, 314) in the animation sequence (330) being printed at the same location on Page X (350).

FIG. 3C shows a page (i.e., Page Y (360)) in accordance with one or more embodiments of the invention. Page Y (360) is the result of printing (e.g., on paper) slide X (300) using system (100) of FIG. 1, discussed above, and/or using the process of FIG. 2, discussed above. As shown in FIG. 3C, page Y (360) includes four frames: frame A (361), frame B (362), frame C (363), and frame D (364). Each frame (361, 362, 363, 364) is a partial replica of slide X (300). Specifically, each frame (361, 362, 363, 364) includes the fixed object (305) but only one of the objects (311, 312, 313, 314) in the animation sequence (330). For example, frame A (361) includes object A (311) but not object B (312), object C (313), or object D (314). Moreover, the position of object A (311) in the frame may be specified in the ED having slide X (300).

Unlike page X (350), page Y (360) does not have the printed animation sequence (352). Although page Y (360) shows four frames (361, 362, 363, 364), page Y (360) may have any number of frames (e.g., 1 frame per page, 2 frames per page, etc.) as specified in a MFPP request from a user.

Embodiments of the invention have one or more of the following advantages: the ability to print slides having animation sequences; the ability to print slides having animation sequences without all the objects in the animation sequences being printed at the same location on the page; the ability to generate and print frames for slides having animation sequences; the ability to specify the number of frames printed on a page, etc.

Figure 4:
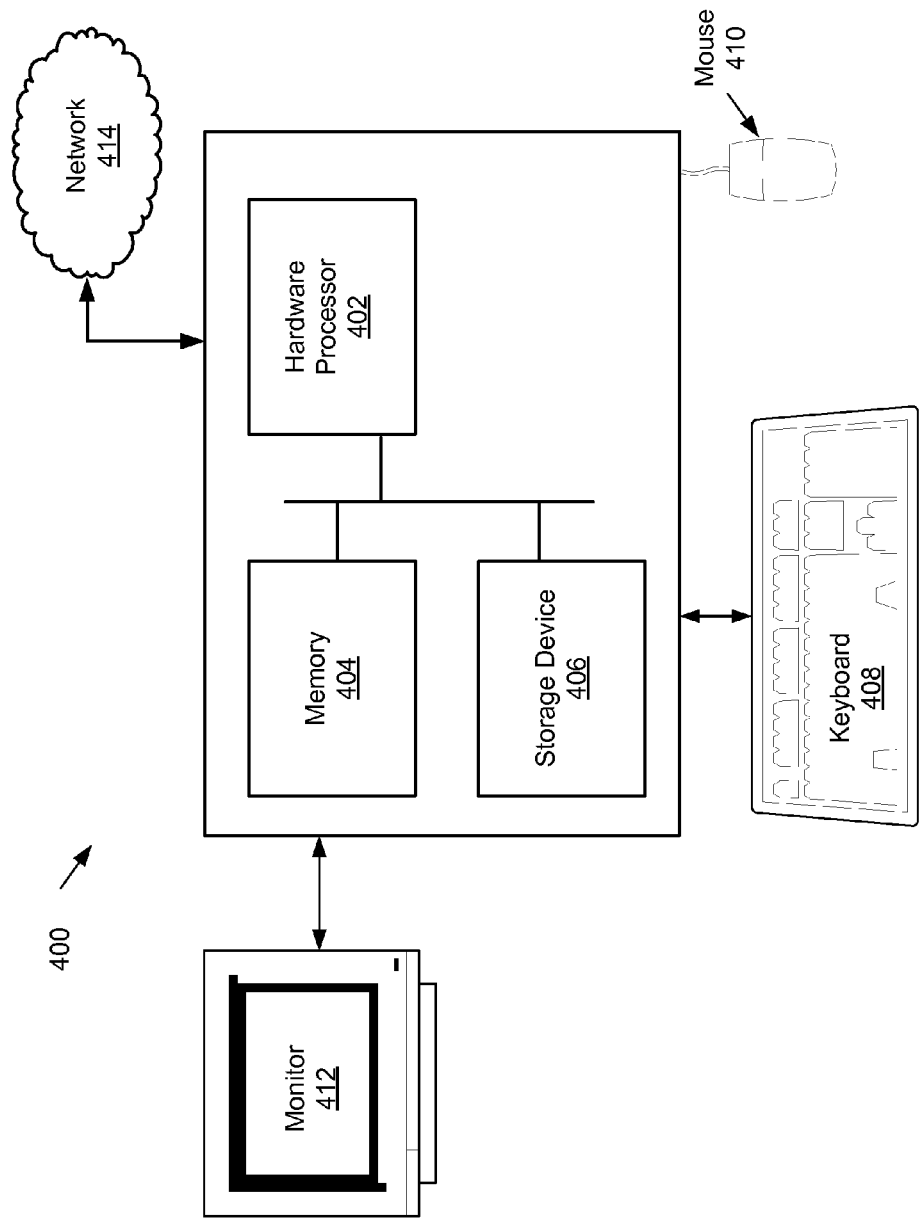
FIG. 4 shows a computer system in accordance with one or more embodiments of the invention.

Embodiments of the invention may be implemented on virtually any type of computer regardless of the platform being used. For example, as shown in FIG. 4, the computer system (400) includes one or more processor(s) (402), associated memory (404) (e.g. random access memory (RAM), cache memory, flash memory, etc.), a storage device (406) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (402) is hardware. For example, the processor may be an integrated circuit. The computer system (400) may also include input means, such as a keyboard (408), a mouse (410), or a microphone (not shown). Further, the computer system (400) may include output means, such as a monitor (412) (e.g. a liquid crystal display (LCD), a plasma display, or cathode ray tube (CRT) monitor). The computer system (400) may be connected to a network (414) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (400) includes at least the minimal processing, input, and/or output means necessary to practice embodiments of the invention.

Further, in one or more embodiments of the invention, one or more elements of the aforementioned computer system (400) may be located at a remote location and connected to the other elements over a network. Further, embodiments of the invention may be implemented on a distributed system having a plurality of nodes, where each portion of the invention (e.g. parser (114), layout engine (118), frame generator (116), etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an electronic document (ED) of a plurality of presentation slides using a page rendering device (PRD), comprising:
 identifying, within the ED, a presentation slide comprising a fixed object, a plurality of objects including a first object and a second object, and a command for an animation effect that sequentially controls the plurality of objects, wherein the fixed object remains visible while the presentation slide is visible and the fixed object is not part of the animation effect;
 generating, based on the identified presentation slide, a first frame lacking the animation effect and comprising the first object of the plurality of objects and the fixed object;
 generating, based on the identified presentation slide, a second frame lacking the animation effect and comprising the second object of the plurality of objects and the fixed object but not the first object; and
 outputting, by the PRD and during a rendering of the ED, the first frame comprising the fixed object and the first object, and the second frame comprising the fixed object and the second object for printing.

2. The method of claim 1, wherein the first frame and the second frame are placed on different rendered pages.

3. The method of claim 1, wherein the ED comprises an Open Office XML (OOXML) format.

4. The method of claim 3, wherein generating the first frame comprises:
 identifying a tag in the ED with a position for the first object by parsing the ED; and
 placing the first object at the position within the first frame.

5. The method of claim 1, further comprising:
 receiving a request for multiple frames per page (MFPP), wherein the first frame and the second frame are placed on the same rendered page in response to the request for MFPP.

6. A non-transitory computer readable medium (CRM) storing instructions for processing an electronic document (ED) of a plurality of presentation slides using a page rendering device (PRD), the instructions comprising functionality for:
 identifying, within the ED, a presentation slide comprising a fixed object, a plurality of objects including a first object and a second object, and a command for an animation effect that sequentially controls the plurality of objects, wherein the fixed object remains visible while the presentation slide is visible and the fixed object is not part of the animation effect;
 generating, based on the identified presentation slide, a first frame lacking the animation effect and comprising the first object of the plurality of objects and the fixed object;
 generating, based on the identified presentation slide, a second frame lacking the animation effect and comprising the second object of the plurality of objects and the fixed object but not the first object; and
 outputting, using the PRD and during a rendering of the ED, the first frame comprising the fixed object and the first object, and the second frame comprising the fixed object and the second object for printing.

7. The non-transitory CRM of claim 6, wherein the first frame and the second frame are placed on different rendered pages.

8. The non-transitory CRM of claim 6, wherein the ED comprises an Open Office XML (OOXML) format.

9. The non-transitory CRM of claim 8, wherein the instructions for generating the first frame further comprise functionality for:
 identifying a tag in the ED with a position for the first object by parsing the ED; and
 placing the first object at the position within the first frame.

10. The non-transitory CRM of claim 6, the instructions further comprising functionality for:
 receiving a request for multiple frames per page (MFPP), wherein the first frame and the second frame are placed on the same rendered page in response to the request for MFPP.

11. A system for processing an electronic document (ED), comprising:
 a hardware processor;
 a parser executing on the hardware processor and configured to identify, within the ED, a presentation slide comprising a fixed object, a plurality of objects including a first object and a second object, and a command for an animation effect that sequentially controls the plurality of objects, wherein the fixed object remains visible while the presentation slide is visible and the fixed object is not part of the animation effect;
 a frame generator executing on the processor and configured to:
  generate, based on the identified presentation slide, a first frame lacking the animation effect and comprising the first object of the plurality of objects and the fixed object; and
  generate, based on the identified presentation slide, a second frame lacking the animation effect and comprising the second object of the plurality of objects and the fixed object but not the first object; and
 a layout engine configured to output, during a rendering of the ED, the first frame comprising the fixed object and the first object, and the second frame comprising the fixed object and the second object for printing.

12. The system of claim 11, further comprising:
 a graphical user interface configured to collect a request for multiple frames per page (MFPP),
 wherein the first frame and the second frame are placed on the same rendered page in response to the request for MFPP.

13. The system of claim 11, wherein the layout engine is located on a printer.

14. The system of claim 11, wherein the first frame and the second frame are placed on different rendered pages.

15. The system of claim 11, wherein the ED comprises an Open Office XML (OOXML) format.

16. The system of claim 15, wherein the parser is further configured to identify a tag in the ED with a position for the first object, and wherein the frame generator is further configured to place the first object at the position within the frame.

* * * * *